United States Patent
Yoon et al.

(10) Patent No.: US 10,804,519 B2
(45) Date of Patent: Oct. 13, 2020

(54) SEPARATOR AND ELECTROCHEMICAL DEVICE INCLUDING THE SAME

(71) Applicant: LG CHEM, LTD., Seoul (KR)

(72) Inventors: Su-Jin Yoon, Daejeon (KR); Hye-Jin Kwon, Daejeon (KR); Min-Ji Kim, Daejeon (KR); Chan-Jong Kim, Daejeon (KR); Kwan-Woo Nam, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/094,139

(22) PCT Filed: Aug. 9, 2017

(86) PCT No.: PCT/KR2017/008651
§ 371 (c)(1),
(2) Date: Oct. 16, 2018

(87) PCT Pub. No.: WO2018/030797
PCT Pub. Date: Feb. 15, 2018

(65) Prior Publication Data
US 2019/0131604 A1    May 2, 2019

(30) Foreign Application Priority Data
Aug. 9, 2016 (KR) .................. 10-2016-0101471

(51) Int. Cl.
*H01M 2/16* (2006.01)
*H01M 2/14* (2006.01)
(Continued)

(52) U.S. Cl.
CPC ......... *H01M 2/1686* (2013.01); *H01M 2/145* (2013.01); *H01M 2/166* (2013.01);
(Continued)

(58) Field of Classification Search
CPC .. H01M 2/1686; H01M 2/145; H01M 2/1653; H01M 2/166; H01M 2/168;
(Continued)

(56) References Cited

U.S. PATENT DOCUMENTS

2009/0311589 A1    12/2009  Kim et al.
2013/0236766 A1     9/2013  Seo et al.
(Continued)

FOREIGN PATENT DOCUMENTS

JP         5670626 B2    2/2015
JP      2016-085949 A    5/2016
(Continued)

OTHER PUBLICATIONS

International Search Report (PCT/ISA/210) issued in PCT/KR2017/008651, dated Dec. 6, 2017.

*Primary Examiner* — Jane J Rhee
(74) *Attorney, Agent, or Firm* — Birch, Stewart, Kolasch & Birch, LLP

(57) ABSTRACT

Disclosed are a separator and an electrochemical device including the same. The separator includes: a porous polymer substrate having a plurality of pores; a separator base including a porous coating layer formed on at least one surface of the porous polymer substrate, and including a plurality of inorganic particles and a binder polymer disposed partially or totally on the surface of the inorganic particles to connect and fix the inorganic particles with each other; and an adhesive porous layer formed on at least one surface of the separator base and including an adhesive resin which shows adhesive property through heating at a temperature lower than the melting point of the porous polymer substrate, wherein the adhesive porous layer is provided with a porous structure formed by phase separation caused by the evaporation rate of a solvent and that of a non-solvent, when applying and drying a coating composition including (Continued)

the adhesive resin, the solvent and the non-solvent on at least one surface of the separator base.

12 Claims, 4 Drawing Sheets

(51) Int. Cl.
   *H01M 10/42*     (2006.01)
   *H01M 10/0525*   (2010.01)
   *H01M 10/052*    (2010.01)
(52) U.S. Cl.
   CPC ..... *H01M 2/1653* (2013.01); *H01M 10/0525* (2013.01); *H01M 10/4235* (2013.01); *H01M 2/168* (2013.01); *H01M 10/052* (2013.01); *H01M 2300/0068* (2013.01)
(58) Field of Classification Search
   CPC ..... H01M 2300/0068; H01M 10/0525; H01M 10/4235; H01M 10/052
   See application file for complete search history.

(56) References Cited

U.S. PATENT DOCUMENTS

| | | |
|---|---|---|
| 2013/0244082 A1 | 9/2013 | Lee et al. |
| 2013/0280583 A1 | 10/2013 | Lee et al. |
| 2015/0004464 A1 | 1/2015 | Okuno et al. |
| 2015/0303427 A1 | 10/2015 | Hyun et al. |
| 2015/0333308 A1* | 11/2015 | Toyoda ................. H01M 2/145 429/144 |

FOREIGN PATENT DOCUMENTS

| | | |
|---|---|---|
| KR | 10-0409019 B1 | 12/2003 |
| KR | 10-0925643 B1 | 11/2009 |
| KR | 10-2012-0046092 A | 5/2012 |
| KR | 10-2013-0011973 A | 1/2013 |
| KR | 10-2013-0045601 A | 5/2013 |
| KR | 10-1298340 B1 | 8/2013 |
| KR | 10-1358764 B1 | 2/2014 |
| KR | 10-1430975 B1 | 8/2014 |
| KR | 10-1455043 B1 | 10/2014 |

* cited by examiner

SEPARATOR AND ELECTROCHEMICAL DEVICE INCLUDING THE SAME

TECHNICAL FIELD

The present disclosure relates to a separator and an electrochemical device including the same. Particularly, the present disclosure relates to a separator having improved adhesion with an electrode and an excellent effect of reducing resistance, and an electrochemical device including the same.

The present application claims priority to Korean Patent Application No. 10-2016-0101471 filed on Aug. 9, 2016 in the Republic of Korea, the disclosures of which are incorporated herein by reference.

BACKGROUND ART

Recently, energy storage technology has been given an increasing attention. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused. More recently, active studies have been conducted about designing a novel electrode and battery in order to improve the capacity density and specific energy in developing such batteries.

Among the commercially available secondary batteries, lithium secondary batteries developed in the early 1990's have been spotlighted, since they have a higher driving voltage and significantly higher energy density as compared to conventional batteries, such as Ni-MH, Ni—Cd and sulfuric acid-lead batteries using an aqueous electrolyte. However, such lithium ion batteries have a problem of ignition and explosion caused by the use of an organic electrolyte and a disadvantage of a difficulty in manufacture. Recent lithium ion polymer batteries improve such a problem and disadvantage of lithium ion batteries and are expected as one of the next-generation batteries. However, such lithium ion polymer batteries still have a relatively low capacity as compared to lithium ion batteries and particularly show an insufficient discharge capacity at low temperature. Thus, there is an imminent need for improving this.

Although such electrochemical devices have been produced from many production companies, safety characteristics thereof show different signs. Evaluation and securement of safety of such electrochemical devices are very important. The most important consideration is that electrochemical devices should not damage users upon their malfunction. For this purpose, safety standards strictly control ignition and smoke emission in electrochemical devices. With regard to safety characteristics of electrochemical devices, there is great concern about explosion when an electrochemical device is overheated to cause thermal runaway or perforation of a separator. Particularly, a polyolefin-based porous substrate used conventionally as a separator for an electrochemical device shows a severe heat shrinking behavior at a temperature of 100° C. or higher due to its material property and a characteristic during its manufacturing process, including orientation, thereby causing a short-circuit between a cathode and an anode.

To solve the above-mentioned safety problems of an electrochemical device, there has been suggested a separator having a porous organic-inorganic coating layer formed by applying a mixture of an excessive amount of inorganic particles and a binder polymer onto at least one surface of a porous substrate having a plurality of pores.

DISCLOSURE

Technical Problem

The present disclosure is designed to solve the problems of the related art, and therefore the present disclosure is directed to providing a separator which has improved adhesion with an electrode and an excellent effect of reducing resistance.

The present disclosure is also directed to providing an electrochemical device including the separator.

Technical Solution

In one aspect of the present disclosure, there is provided the separators according to the following embodiments.

According to a first embodiment, there is provided a separator including:

a porous polymer substrate having a plurality of pores;

a separator base including a porous coating layer formed on at least one surface of the porous polymer substrate, and including a plurality of inorganic particles and a binder polymer disposed partially or totally on the surface of the inorganic particles to connect and fix the inorganic particles with each other; and an adhesive porous layer formed on at least one surface of the separator base and including an adhesive resin which shows adhesive property through heating at a temperature lower than the melting point of the porous polymer substrate, wherein the adhesive porous layer is provided with a porous structure formed by phase separation caused by the evaporation rate of a solvent and that of a non-solvent, when applying and drying a coating composition including the adhesive resin, the solvent and the non-solvent on at least one surface of the separator base.

According to a second embodiment, there is provided the separator of the first embodiment, wherein the porous polymer substrate is a polyolefin-based porous polymer substrate.

According to a third embodiment, there is provided the separator of the second embodiment, wherein the polyolefin-based porous polymer substrate includes any one polymer selected from the group consisting of polyethylene, polypropylene, polybutylene and polypentene, or a combination thereof.

According to a fourth embodiment, there is provided the separator of any one of the first embodiment to the third embodiment, wherein the porous polymer substrate has a thickness of 5-50 μm, a pore size of 0.01-50 μm and a porosity of 10-95%.

According to a fifth embodiment, there is provided the separator of any one of the first embodiment to the fourth embodiment, wherein the binder polymer is any one selected from the group consisting of polyvinylidene fluoride-co-hexafluoropropylene, polyvinylidene fluoride-co-trichloro ethylene, polymethyl methacrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinylalchol, cyanoethyl cellulose, cyanoethyl sucrose, pullulan and carboxymethyl cellulose, or a mixture of at least two of them.

According to a sixth embodiment, there is provided the separator of the first embodiment to the fifth embodiment, wherein the inorganic particles are boehmite particles alone or a combination of boehmite particles with non-boehmite particles.

According to a seventh embodiment, there is provided the separator of the sixth embodiment, wherein the non-boehmite particles include inorganic particles having a dielectric constant of 5 or more, inorganic particles capable of transporting lithium ions or a mixture thereof.

According to an eighth embodiment, there is provided the separator of the sixth embodiment, wherein the boehmite particles have an average particle diameter of 0.05-2 μm and the non-boehmite particles have an average particle diameter of 0.3-3 μm.

According to a ninth embodiment, there is provided the separator of any one of the first embodiment to the eighth embodiment, wherein the adhesive resin is any one selected from the group consisting of polyvinylidene fluoride-co-hexafluoropropylene, polyvinylidene fluoride-co-trichloro ethylene, polymethyl methacrylate, polybutyl acrylate, polyacrylonitrile, polyvinyl pyrrolidone, polyvinyl acetate, polyethylene-co-vinylacetate, polyethylene oxide, polyarylate, cellulose acetate, cellulose acetate butyrate, cellulose acetate propionate, cyanoethylpullulan, cyanoethylpolyvinylalchol, cyanoethyl cellulose, cyanoethyl sucrose, pullulan and carboxymethyl cellulose, or a mixture of at least two of them.

In another aspect of the present disclosure, there is provided a method for manufacturing a separator.

According to a tenth embodiment, there is provided a method for manufacturing a separator, including the steps of:

forming a porous coating layer including a plurality of inorganic particles and a binder polymer on at least one surface of a porous polymer substrate having a plurality of pores to prepare a separator base; and forming, on at least one surface of the separator base, an adhesive porous layer including an adhesive resin which shows adhesive property through heating at a temperature lower than the melting point of the porous polymer substrate, wherein the step of forming an adhesive porous layer includes:

applying a coating composition including the adhesive resin, a solvent and a non-solvent onto at least one surface of the separator base; and drying the coating composition to form a porous structure through phase separation caused by the evaporation rate of the solvent and that of the non-solvent.

According to an eleventh embodiment, there is provided the method for manufacturing a separator of the tenth embodiment, wherein the solvent is any one compound selected from acetone, tetrahydrofuran, methylene chloride, chloroform, dimethyl formamide, N-methyl-2-pyrrolidone, methyl ethyl ketone and cyclohexane, or a mixture thereof and the non-solvent is any one compound selected from methanol, ethanol, isopropyl alcohol, propanol and water, or a mixture thereof.

In still another aspect of the present disclosure, there is also provided the electrochemical devices according to the following embodiments.

According to a twelfth embodiment, there is provided an electrochemical device including a cathode, an anode and a separator interposed between the cathode and the anode, wherein the separator is the separator as defined in any one of the first embodiment to the ninth embodiment.

According to a thirteenth embodiment, there is provided an electrochemical device of the twelfth embodiment, which is a lithium secondary battery.

Advantageous Effects

According to an embodiment of the present disclosure, a porous coating layer including inorganic particles and a binder polymer and an adhesive porous layer are coated sequentially to allow thin film coating, while maintaining excellent adhesion with an electrode. In addition, the adhesive porous layer formed through a dry phase separation process has an improved porous structure so that the problem of resistance of a separator may be alleviated and coating uniformity may be ensured.

BEST MODE

Figure 1:
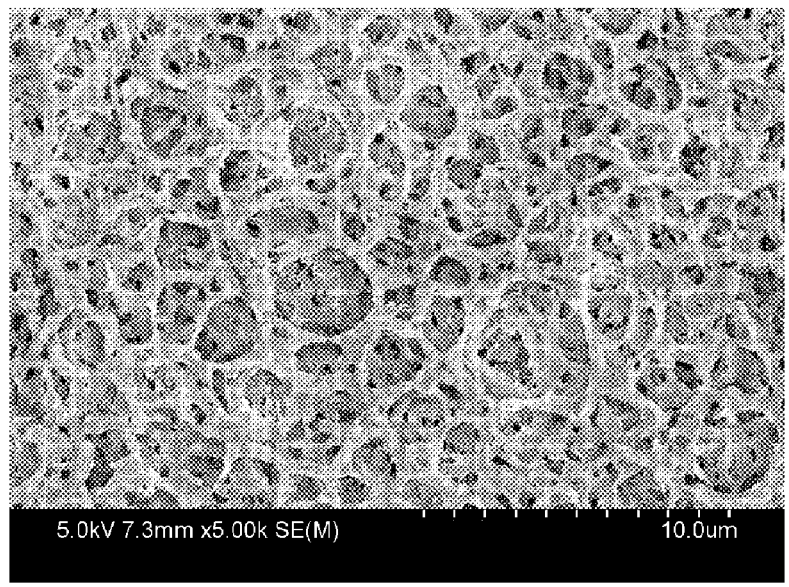
FIGS. 1-7 show photographic images taken by field emission scanning electron microscopy (FE-EMS) of the surface morphology of each of the separators according to Examples 1-5 and Comparative Examples 1 and 2.
Figure 2:
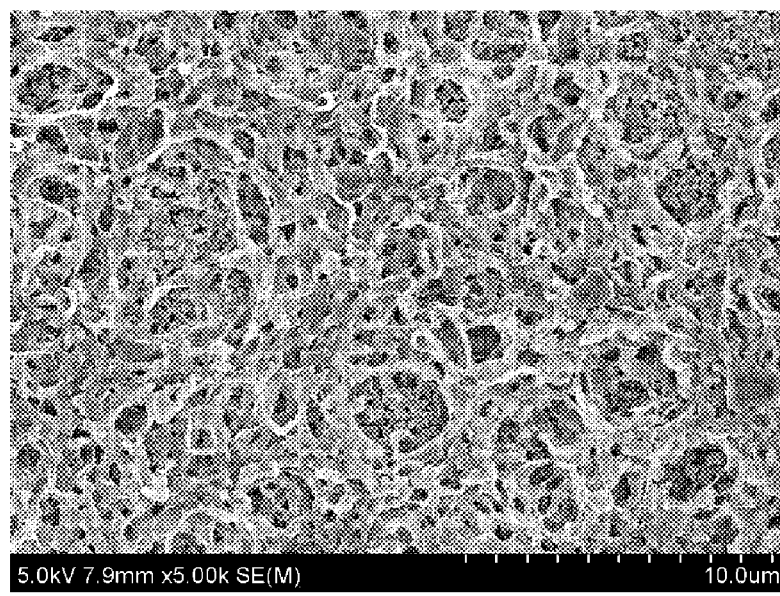
Figure 3:
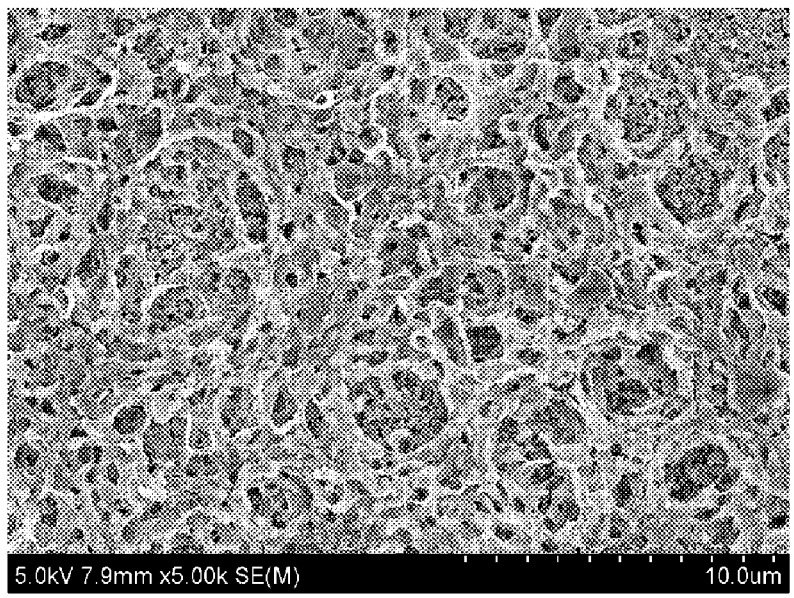
Figure 4:
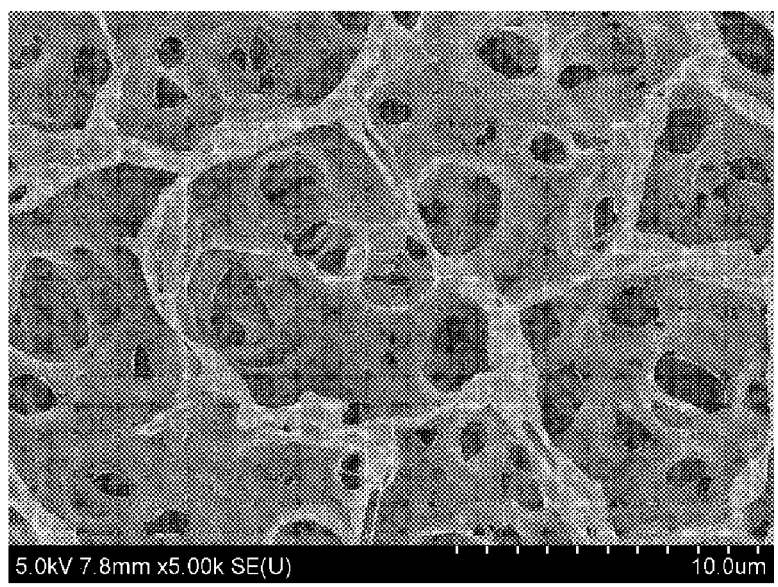
Figure 5:
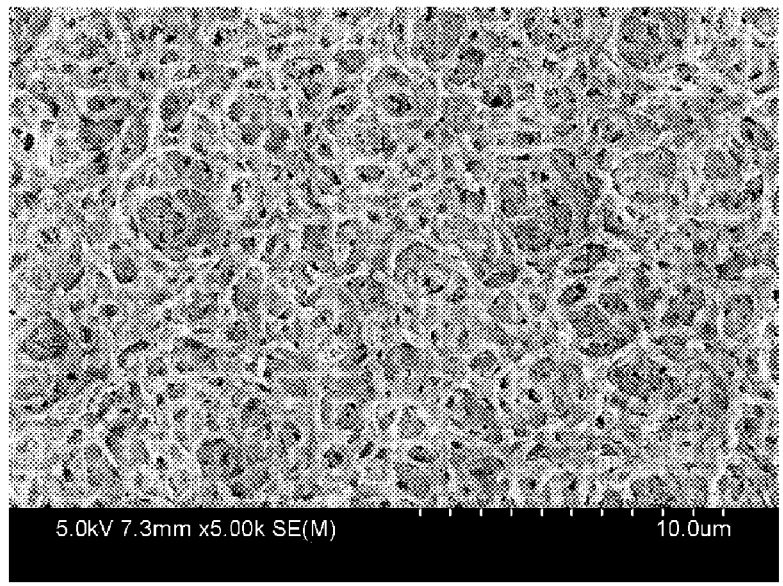

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

The separator according to an embodiment of the present disclosure includes:

a porous polymer substrate having a plurality of pores;

a separator base including a porous coating layer formed on at least one surface of the porous polymer substrate, and including a plurality of inorganic particles and a binder polymer disposed partially or totally on the surface of the inorganic particles to connect and fix the inorganic particles with each other; and an adhesive porous layer formed on at least one surface of the separator base and including an adhesive resin which shows adhesive property through heating at a temperature lower than the melting point of the porous polymer substrate, wherein the adhesive porous layer is provided with a porous structure formed by phase separation caused by the evaporation rate of a solvent and that of a non-solvent, when applying and drying a coating composition including the adhesive resin, the solvent and the non-solvent on at least one surface of the separator base.

According to the related art, a slurry for forming a porous organic-inorganic coating layer including inorganic particles in combination with a binder polymer is applied onto a porous polymer substrate, and then a structure enriched with the binder polymer on the surface is formed through a vapor-induced phase separation process in order to impart adhesive property with an electrode.

In other words, vapor-induced phase separation refers to a process which includes preparing a slurry for forming a porous organic-inorganic coating layer merely by using a solvent for the binder polymer, and carrying out drying while the porous polymer substrate coated with the slurry is exposed to an environment abundant in water as a non-solvent for the binder polymer so that the binder polymer may be gelled on the surface of the coating layer that is in direct contact with the atmosphere of water as a non-solvent to form a layered structure relatively enriched with the binder polymer.

However, when forming a surface layer having a large content of the binder polymer through such vapor-induced phase separation and applying the same as an electrode adhesive layer, there is a problem in that an electrode adhesive layer having an excessively large thickness functions as resistance and an electrode adhesive layer having an excessively small thickness cannot realize adhesive property sufficiently. Particularly, in the case of vapor-induced phase separation, there is a disadvantage in that it is not easy to control the thickness of a layered structure formed as an electrode adhesive layer.

In addition, since vapor-induced phase separation is carried out on the surface of a slurry coating layer, it causes significant degradation of surface uniformity of the coating layer. Moreover, the binder is distributed with a structure enriched with the polymer from the surface layer toward the interfacial layer, resulting in an increase in resistance of the coated separator.

On the contrary, the separator according to an embodiment of the present disclosure is provided with a porous structure formed by phase separation caused by the evaporation rate of a solvent and that of a non-solvent, when applying and drying a coating composition including the adhesive resin, the solvent and the non-solvent on at least one surface of the separator base.

As used herein, the term 'solvent' refers to one capable of dissolving an adhesive resin in an amount of 5 wt % or more even at a low temperature of 60° C. or less, while the term 'non-solvent' refers to one that cannot dissolve or swell an adhesive resin at a temperature up to the melting point of an adhesive resin or the boiling point of a liquid.

Herein, the non-solvent corresponds to one that has a boiling point higher than that of the solvent and an evaporation rate lower than that of the solvent, and cannot dissolve or swell the adhesive resin forming the adhesive porous layer.

The coating composition including the adhesive resin, solvent and non-solvent forms a homogeneous single phase. However, while the coating composition is applied and dried on at least one surface of the separator base, it becomes a thermodynamically unstable state at the initial stage, and thus is converted into a two-phase solution.

In other words, upon drying, the solvent having a lower boiling point evaporates preferentially so that the concentration of the non-solvent is increased relatively in the applied composition. As a result, phase separation between the non-solvent and the adhesive resin non-compatible with each other is accelerated to cause separation into an adhesive resin-rich phase and an adhesive resin-poor phase.

As the solvent evaporates, the concentration of the adhesive resin is increased and the solvation property thereof is decreased, and thus the adhesive resin-rich phase is solidified to form a sold matrix surrounding the adhesive resin-poor phase. Herein, while the non-solvent surrounded with the solid matrix phase and packed therein is removed finally during the evaporation, the packed space is transformed into pores, thereby providing an adhesive porous layer having a porous morphology. Herein, the binder is distributed with a polymer-poor structure from the surface layer toward the interfacial layer, and thus contributes to a decrease in resistance of the coated separator.

According to an embodiment, when porous coating layers are formed on both surfaces of the porous polymer substrate, the adhesive porous layer may be formed on each of the top surfaces of the porous coating layers. In addition, when a porous coating layer is formed merely on one surface of the porous polymer substrate, the adhesive porous layer may be formed directly on the top surface of the porous coating layer and the other surface of the porous polymer substrate having no porous coating layer.

Particularly, the porous polymer substrate may be a porous polymer film substrate or porous polymer non-woven web substrate.

The porous polymer film substrate may include a porous polymer film including a polyolefin, such as polyethylene or polypropylene. For example, such a polyolefin porous polymer film substrate realizes a shut-down function at a temperature of 80-130° C.

Herein, the polyolefin porous polymer film may include a polymer formed of polyethylene, such as high-density polyethylene, linear low-density polyethylene, low-density polyethylene and ultrahigh-molecular weight polyethylene, polypropylene, polybutylene and polypentene alone or in combination.

In addition, the porous polymer film substrate may be prepared by using various polymers, such as polyesters, in addition to polyolefins and forming the polymers into a film shape. The porous polymer film substrate may be formed to have a stacked structure of two or more film layers, wherein each film layer may include the abovementioned polymers, such as polyolefins and polyesters, alone or in combination.

In addition to the above-mentioned polyolefins, the porous polymer film substrate and the porous non-woven web substrate may include polyethylene terephthalate, polybutylene terephthalate, polyester, polyacetal, polyamide, polycarbonate, polyimide, polyether ether ketone, polyether sulfone, polyphenylene oxide, polyether sulfone, polyphenylene oxide, polyphenylene sulfide, polyethylene naphthalene, or the like, alone or in combination.

Although there is no particular limitation in the thickness of the porous substrate, the porous substrate may have a thickness of 1-100 μm, particularly 5-50 μm. Although the pore size and porosity of the pores present in the porous substrate are not also limited particularly, it is preferred that the pore size and porosity are 0.01-50 μm and 10-95%, respectively.

In the separator according to an embodiment of the present disclosure, the binder polymer used for forming the porous coating layer may be one used currently for forming a porous coating layer in the art. Particularly, a polymer having a glass transition temperature ($T_g$) of −200 to 200° C. may be used. This is because such a polymer can improve the mechanical properties, such as flexibility and elasticity, of the finally formed porous coating layer. Such a binder polymer functions as a binder which connects and stably fixes the inorganic particles with each other, and thus contributes to prevention of degradation of mechanical properties of a separator having a porous coating layer.

In addition, it is not essentially required for the binder polymer to have ion conductivity. However, when using a polymer having ion conductivity, it is possible to further improve the performance of an electrochemical device. Therefore, a binder polymer having a dielectric constant as high as possible may be used. In fact, since the dissociation degree of a salt in an electrolyte depends on the dielectric constant of the solvent for the electrolyte, a binder polymer having a higher dielectric constant can improve the salt dissociation degree in an electrolyte. The binder polymer may have a dielectric constant ranging from 1.0 to 100 (measured at a frequency of 1 kHz), particularly 10 or more.

In addition to the above-mentioned function, the binder polymer may be characterized in that it is gelled upon the impregnation with a liquid electrolyte and thus shows a high degree of swelling. Thus, the binder polymer has a solubility parameter (i.e., Hildebrand solubility parameter) of 15-45 $MPa^{1/2}$ or 15-25 $MPa^{1/2}$ and 30-45 $MPa^{1/2}$. Therefore, hydrophilic polymers having many polar groups may be used more frequently as compared to hydrophobic polymers, such as polyolefins. When the solubility parameter is less than 15 $MPa^{1/2}$ and more than $45^{1/2}$, it is difficult for the binder polymer to be swelled with a conventional liquid electrolyte for a battery.

Non-limiting examples of the binder polymer include but are not limited to: polyvinylidene fluoride-co-hexafluoropropylene, polyvinylidene fluoride-co-trichloro ethylene, polymethyl methacrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinylalchol, cyanoethyl cellulose, cyanoethyl sucrose, pullulan and carboxymethyl cellulose.

For example, the weight ratio between the inorganic particles and the binder polymer is 50:50-99:1, particularly 70:30-95:5. When the ratio of the inorganic particles based on the binder polymer satisfies the above-defined range, it is possible to prevent the problem of degradation of pore size and porosity of a coating layer caused by an increased amount of binder polymer. It is also possible to solve the problem of weakening of peeling resistance of a coating layer caused by an insufficient amount of binder polymer.

Besides the above-mentioned inorganic particles and polymer, the separator according to an embodiment of the present disclosure may further include other additives as ingredients for the porous coating layer.

According to the present disclosure, boehmite particles are used as inorganic particles alone or in combination with non-boehmite particles.

As used herein, the term 'non-boehmite particles' refers to inorganic particles other than boehmite particles. The porous coating layer according to the present disclosure includes two different types of inorganic particles, such as boehmite particles and inorganic particles other than boehmite particles.

Boehmite is represented by the chemical formula of AlO(OH) or $Al_2O_3H_2O$ and is a chemically stable alumina monohydrate obtained generally by heat treatment or hydrothermal treatment of alumina trihydrate in the air. Boehmite has a high dehydration temperature of 450-530° C. and may be controlled to have various shapes, including plate-like boehmite, needle-like boehmite and hexangular plate-like boehmite, by adjusting the preparing condition. In addition, it is possible to control the aspect ratio or particle diameter by controlling the preparing condition. Therefore, it is possible to provide various applications with boehmite by using the properties thereof.

In addition, non-limiting examples of non-boehmite particles may include high-dielectric constant inorganic particles having a dielectric constant of 5 or more, particularly 10 or more, inorganic particles capable of transporting lithium ions or a mixture thereof.

Non-limiting examples of the inorganic particles having a dielectric constant of 5 or more include $BaTiO_3$, $Pb(Zr,Ti)O_3$ (PZT), $Pb_{1-x}La_xZr_{1-y}Ti_yO_3$(PLZT), $PB(Mg_3Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC or a mixture thereof.

As used herein, the term 'inorganic particles capable of transporting lithium ions' refers to inorganic particles which contains a lithium element and functions to transport lithium ions not to store lithium. Non-limiting examples of the inorganic particles capable of transporting lithium ions include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$-based glass ($0<x<4$, $0<y<13$) such as $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$) such as $Li_{3.25}Ge_{0.25}P_{0.75}S_4$, lithium nitride ($Li_xN_y$, $0<x<4$, $0<y<2$) such as $Li_3N$, $SiS_2$-based glass ($Li_xSi_yS_z$, $0<x<3$, $0<y<2$, $0<z<4$) such as $Li_3PO_4$—$Li_2S$—$SiS_2$, $P_2S_5$-based glass ($Li_xP_yS_z$, $0<x<3$, $0<y<3$, $0<z<7$) such as $LiI$—$Li_2S$—$P_2S_5$, or a mixture thereof.

According to an embodiment of the present disclosure, when the inorganic particles include a mixture of boehmite particles with non-boehmite particles, the weight ratio between the boehmite particles and the binder polymer may be 1:1-1:5.

When the weight ratio of the boehmite particles to the binder polymer is less than 1:1 (when the content of the binder polymer is decreased), the amount of binder which can bind boehmite particles among themselves or perform binding between boehmite particles and the substrate is insufficient, thereby causing separation. When the weight ratio of the boehmite particles to the binder polymer is larger than 1:5 (when the content of the binder polymer is increased), an excessive amount of binder polymer is present to cause a decrease in pore size and porosity of the porous coating layer and an increase in resistance of the separator, which may result in degradation of the performance of a battery.

According to another embodiment, when the inorganic particles include a mixture of boehmite particles with non-boehmite particles, the weight ratio of the non-boehmite particles to the boehmite particles may be 1:99-99:1.

When the weight ratio of the non-boehmite particles and the boehmite particles satisfies the above-defined range, it is not required to increase the amount of binder polymer significantly in order to prevent separation of boehmite caused by an increased amount of boehmite. In addition, the dispersion stability or processability of a coating composition for forming a porous coating layer is improved significantly, a porous coating layer having a uniform thickness can be formed, and the porosity of a porous coating layer can be controlled with ease.

The boehmite particles may have an average particle diameter 0.01-0.9 times, particularly 0.015-0.85 times, and more particularly 0.02-0.08 times higher than the average particle diameter of the non-boehmite particles.

According to another embodiment of the present disclosure, the non-boehmite particles may have an average particle diameter of 0.3-3 μm, particularly 0.4-2.7 μm, and more particularly 0.5-2.5 μm, while the boehmite particles may have an average particle diameter of 0.05-2 μm, particularly 0.07-1.5 μm, and more particularly 0.09-1 μm.

According to still another embodiment, the inorganic particles may include non-boehmite particles having an average particle diameter different from the average particle diameter of boehmite particles. Therefore, the dispersibility and coating processability of the inorganic particles in a composition for forming a porous coating layer are improved, controlling of the thickness of a coating layer is facilitated, and degradation of mechanical properties and electrical properties can be improved. In addition, since particles with a smaller particle diameter may be positioned in large pores formed between particles with a larger particle diameter, it is possible to control the size of pores of the resultant porous coating layer. It is also possible to prevent an internal short-circuit during charging and discharging of a battery by improving the density of the porous coating layer and inhibiting a heat shrinking phenomenon of the porous substrate.

Particularly, according to still another embodiment, non-boehmite particles are used in combination with boehmite particles having a smaller particle diameter as compared to the non-boehmite particles. Thus, it is possible to obtain more advantageous effects as described hereinafter, when compared to the use of the same type of inorganic particles merely different in terms of particle size.

For example, when the non-boehmite particles are alumina particles, alumina particles are compounds of aluminum and oxygen which have a chemical formula of $Al_2O_3$ and are known as electric insulators having relatively high heat conductivity and a density of 3.95-4.1 g/cm$^3$.

Meanwhile, the boehmite particles generally have a density of about 2.4-3.1 g/cm$^3$.

In addition, boehmite particles have excellent heat-absorbing property and contain hydroxyl groups to provide high hydrophilicity and to be controlled to have a high specific surface area. Thus, boehmite particles can function as carriers provided with additives useful for electrochemical devices. Further, boehmite has a heat conductivity similar to the heat conductivity of alumina and thus is useful as a heat conductive filler. Particularly, boehmite having a high aspect ratio shows anisotropy, and thus can provide increased heat conductivity in a predetermined direction even when it is added in a small amount. Thus, when an abnormal temperature increase occurs in an electrochemical device, boehmite can transfer heat to the outside by virtue of its high heat conductivity.

Therefore, when the porous coating layer according to the present disclosure uses alumina particles, which are non-boehmite particles, as larger-particle diameter inorganic particles, in combination with boehmite particles having a smaller average particle diameter and a relatively smaller density as compared to the alumina particles, it is possible to reduce the total weight of a separator and to assist weight lightening of an electrochemical device. In addition, as described above, boehmite particles can be realized as various shapes, such as a plate-like shape, other than a spherical shape. Thus, even when spherical alumina particles are arranged while being adjacent to each other or being spaced apart significantly from each other, boehmite particles can be disposed easily in various shapes of pores among the alumina particles. As a result, it is possible to improve the density and mechanical properties of a porous coating layer significantly and to inhibit heat shrinking of a porous substrate, and thus to prevent an internal short-circuit of an electrochemical device.

For example, when using alumina particles having different average particle diameters, or larger-particle diameter alumina particles and smaller-particle diameter alumina particles, smaller-particle diameter alumina particles are problematic in that they are significantly expensive and are difficult to handle as compared to larger-particle alumina particles. However, according to an embodiment of the present disclosure, alumina particles are used in combination with boehmite particles having a smaller average particle diameter than that of alumina particles. Therefore, it is possible to overcome the above-mentioned problem.

Although there is no particular limitation in the thickness of the porous coating layer, the porous coating layer may have a thickness of 1-10 μm, particularly 1.5-6 μm. Also, there is no particular limitation in the porosity of the porous coating layer, the porous coating layer may have a porosity of 35-65%.

According to still another embodiment of the present disclosure, the porous coating layer may be an oil-based coating layer using an organic slurry or an aqueous coating layer using an aqueous slurry. In the case of an aqueous coating layer, it may be more advantageous since it is favorable to thin film coating and reduces resistance of a separator.

The adhesive resin may be any one selected from the group consisting of polyvinylidene fluoride-co-hexafluoropropylene, polyvinylidene fluoride-co-trichloro ethylene, polymethyl methacrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinylalchol, cyanoethyl cellulose, cyanoethyl sucrose, pullulan and carboxymethyl cellulose, or a mixture of at least two of them.

In another aspect of the present disclosure, there is provided a method for manufacturing a separator, including the steps of:

forming a porous coating layer including a plurality of inorganic particles and a binder polymer on at least one surface of a porous polymer substrate having a plurality of pores to prepare a separator base; and forming, on at least one surface of the separator base, an adhesive porous layer including an adhesive resin which shows adhesive property through heating at a temperature lower than the melting point of the porous polymer substrate, wherein the step of forming an adhesive porous layer includes:

applying a coating composition including the adhesive resin, a solvent and a non-solvent onto at least one surface of the separator base; and drying the coating composition to form a porous structure through phase separation caused by the evaporation rate of the solvent and that of the non-solvent. The drying temperature may be 100° C. or lower.

First, the composition for forming a porous coating layer may be obtained by dissolving a binder into a solvent, adding inorganic particles thereto and dispersing them. The inorganic particles may be added after they are pulverized in advance to a predetermined average particle diameter. Otherwise, the inorganic particles may be added to a binder solution, and then pulverized and dispersed while controlling them to have a predetermined average particle diameter by using a ball milling process, or the like.

Although there is no particular limitation in the process for coating the composition for forming a porous coating layer onto the porous substrate, it is preferred to use a slot coating or dip coating process. A slot coating process includes coating a composition supplied through a slot die onto the whole surface of a substrate and is capable of controlling the thickness of a coating layer depending on the flux supplied from a metering pump. In addition, dip coating includes dipping a substrate into a tank containing a composition to carry out coating and is capable of controlling the thickness of a coating layer depending on the concentration of the composition and the rate of removing the substrate from the composition tank. Further, in order to control the coating thickness more precisely, it is possible to carry out post-metering through a Mayer bar or the like, after dipping.

Then, the porous substrate coated with the composition for forming a porous coating layer is dried by using a dryer, such as an oven, thereby forming porous coating layers having a symmetric structure on at least one surface of the porous substrate.

In the porous coating layers, the inorganic particles are bound among themselves by the binder while they are packed and are in contact with each other. Thus, interstitial volumes are formed among the inorganic particles and the interstitial volumes become vacant spaces to form pores.

In other words, the binder attaches the inorganic particles to each other so that they may retain their binding states. For example, the binder polymer connects and fixes the inorganic particles with each other. In addition, the pores of the porous coating layer are those formed by the interstitial volumes among the inorganic particles which become vacant spaces. The space is defined by the inorganic particles facing each other substantially in a closely packed or densely packed structure of the inorganic particles.

Next, an adhesive porous layer including an adhesive resin which shows adhesive property through heating at a temperature lower than the melting point of the porous polymer substrate is formed on at least one surface of the separator base.

Particularly, the step of forming an adhesive porous layer includes applying a coating composition including the adhesive resin, a solvent and a non-solvent onto at least one surface of the separator base; and drying the coating composition to form a porous structure through phase separation caused by the evaporation rate of the solvent and that of the non-solvent.

The method for applying the coating composition onto at least one surface of the separator base preferably includes a slot coating or dip coating process.

The solvent used herein preferably has a solubility parameter similar to the solubility parameter of the adhesive resin and a low boiling point. This is intended to facilitate uniform mixing and subsequent solvent removal. Non-limiting examples of the solvent may include any one compound selected from acetone, tetrahydrofuran, methylene chloride, chloroform, dimethyl formamide, N-methyl-2-pyrrolidone, methyl ethyl ketone and cyclohexane, or a mixture thereof.

In addition, non-limiting examples of the non-solvent may include any one compound selected from methanol, ethanol, isopropyl alcohol, propanol and water, or a mixture thereof. A suitable non-solvent may be selected depending on the particular type of adhesive resin used for the adhesive porous layer.

The weight ratio between the solvent and the non-solvent may be 50:50-99:1, particularly 70:30-98:2, and more particularly 85:15-97:3. When the content of the non-solvent satisfies the above-defined range, it is possible to obtain the effect derived from the use of a non-solvent, while preventing the problem caused by gelling during the preparation of the coating composition, and to form an adhesive layer having a porous structure.

The adhesive porous layer may have a thickness of 0.1-8 µm, particularly 0.5-4 µm. There is no particular limitation in the porosity of the adhesive porous layer, the porosity may be 30-60% preferably.

The electrochemical device according to another aspect of the present disclosure includes a cathode, an anode and a separator interposed between the cathode and the anode, wherein the separator is the above-described separator according to an embodiment of the present disclosure.

The electrochemical device includes any device which carries out electrochemical reaction, and particular examples thereof include all types of primary batteries, secondary batteries, fuel cells, solar cells or capacitors such as super capacitor devices. Particularly, among the secondary batteries, lithium secondary batteries, including lithium metal secondary batteries, lithium ion secondary batteries, lithium polymer secondary batteries or lithium ion polymer ion batteries, are preferred.

The two electrodes, cathode and anode, used in combination with the separator according to the present disclosure are not particularly limited, and may be obtained by allowing electrode active materials to be bound to an electrode current collector through a method generally known in the art. Among the electrode active materials, non-limiting examples of a cathode active material include conventional cathode active materials that may be used for the cathodes for conventional electrochemical devices. Particularly, lithium manganese oxides, lithium cobalt oxides, lithium nickel oxides, lithium iron oxides or lithium composite oxides containing a combination thereof are used preferably. Non-limiting examples of an anode active material include conventional anode active materials that may be used for the anodes for conventional electrochemical devices. Particularly, lithium-intercalating materials, such as lithium metal or lithium alloys, carbon, petroleum coke, activated carbon, graphite or other carbonaceous materials, are used preferably. Non-limiting examples of a cathode current collector include foil made of aluminum, nickel or a combination thereof. Non-limiting examples of an anode current collector include foil made of copper, gold, nickel, nickel alloys or a combination thereof.

The electrolyte that may be used in the electrochemical device according to the present disclosure is a salt having a structure of $A^+B^-$, wherein $A^+$ includes an alkali metal cation such as $Li^+$, $Na^+$, $K^+$ or a combination thereof and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2$, $C(CF_2SO_2)_3^-$ or a combination thereof, the salt being dissolved or dissociated in an organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (g-butyrolactone) or a combination thereof. However, the present disclosure is not limited thereto.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

EXAMPLE 1

Polyvinylidene fluoride-co-hexafluoroproyplene (PVdF)-HFP as a binder was added to acetone and dissolved therein at 50° C. for about 12 hours or more to prepare a binder polymer solution. To the resultant binder polymer solution, alumina ($Al_2O_3$) particles having an average particle diameter of 500 nm as non-boehmite particles and boehmite (γ-ALO(OH)) particles having an average particle diameter of 250 nm were added, and then dispersed therein to obtain a slurry for a porous coating layer.

The obtained slurry was coated onto one surface of a polyethylene porous membrane (air permeability 160 sec/100 mL, resistance 0.6 ohm) having a thickness of 7 μm through a slot coating process and the coating thickness was controlled to about 2 μm to obtain a separator provided with a porous coating layer on one surface thereof.

In the porous coating layer, the binder polymer was 5 wt % based on the total weight of the porous coating layer and the weight ratio of the boehmite particles:binder polymer was 1:1.2.

Then, acetone as a solvent and isopropanol as a non-solvent were mixed at a weight ratio of 95:5, and then polyvinylidene fluoride-co-hexafluoroproyplene (PVdF-HFP) as an adhesive resin was added thereto in an amount of 2 parts by weight based on 100 parts by weight of the combined weight of acetone and isopropanol and dissolved therein at 50° C. for about 12 hours to obtain a coating composition for an adhesive porous coating layer.

The obtained coating composition for an adhesive porous layer was applied onto the separator base through a dip coating process and subjected to a dry phase separation process including a drying step at 100° C. or lower, thereby providing a separator having adhesive porous layers on both surfaces of the separator base.

The resultant separator had an asymmetric structure on both surfaces in the order of adhesive porous layer/porous polymer substrate/porous coating layer/adhesive porous layer.

In addition, in the separator, the porous coating layer and the adhesive porous layer had a thickness of 2 μm and 1 μm, respectively.

EXAMPLE 2

A separator was manufactured in the same manner as Example 1, except that acetone as a solvent and isopropanol as a non-solvent were mixed at a weight ratio of 80:20 and polyvinylidene fluoride-co-hexafluoroproyplene (PVdF-HFP) as an adhesive resin was added thereto in an amount of 2 parts by weight based on 100 parts by weight of the combined weight of acetone and isopropanol and dissolved therein at 50° C. for about 12 hours when preparing a coating composition for an adhesive porous coating layer.

The resultant separator had an asymmetric structure on both surfaces in the order of adhesive porous layer/porous polymer substrate/porous coating layer/adhesive porous layer.

In addition, in the separator, the porous coating layer and the adhesive porous layer had a thickness of 2 μm and 1 μm, respectively.

EXAMPLE 3

Polyvinylidene fluoride-co-hexafluoroproyplene (PVdF)-HFP as a binder was added to acetone and dissolved therein at 50° C. for about 12 hours or more to prepare a binder polymer solution. To the resultant binder polymer solution, alumina ($Al_2O_3$) particles having an average particle diameter of 500 nm as non-boehmite particles and boehmite (γ-ALO(OH)) particles having an average particle diameter of 250 nm were added, and then dispersed therein to obtain a slurry for a porous coating layer.

The obtained slurry was coated onto both surface of a polyethylene porous membrane (porosity 40%) having a thickness of 12 μm through a slot coating process and the coating thickness was controlled to about 1.25 μm to obtain a separator provided with a porous coating layer on both surfaces thereof.

In the porous coating layer, the binder polymer was 5 wt % based on the total weight of the porous coating layer and the weight ratio of the boehmite particles:binder polymer was 1:1.2.

Then, acetone as a solvent and isopropanol as a non-solvent were mixed at a weight ratio of 95:5, and then polyvinylidene fluoride-co-hexafluoroproyplene (PVdF-HFP) as an adhesive resin was added thereto in an amount of 2 parts by weight based on 100 parts by weight of the combined weight of acetone and isopropanol and dissolved therein at 50° C. for about 12 hours to obtain a coating composition for an adhesive porous coating layer.

The obtained coating composition for an adhesive porous layer was applied onto the separator base through a dip coating process and subjected to a dry phase separation process including a drying step at 100° C. or lower, thereby providing a separator having adhesive porous layers on both surfaces of the separator base.

The resultant separator had a symmetric structure on both surfaces in the order of adhesive porous layer/porous coating layer/porous polymer substrate/porous coating layer/adhesive porous layer.

In addition, in the separator, the porous coating layer and the adhesive porous layer had a thickness of 1.25 μm and 0.75 μm, respectively.

EXAMPLE 4

A separator was manufactured in the same manner as Example 1, except that acetone as a solvent and methanol as a non-solvent were mixed at a weight ratio of 80:20 and polyvinylidene fluoride-co-hexafluoroproyplene (PVdF-HFP) as an adhesive resin was added thereto in an amount of 2 parts by weight based on 100 parts by weight of the combined weight of acetone and isopropanol and dissolved therein at 50° C. for about 12 hours when preparing a coating composition for an adhesive porous coating layer.

The resultant separator had an asymmetric structure on both surfaces in the order of adhesive porous layer/porous polymer substrate/porous coating layer/adhesive porous layer.

In addition, in the separator, the porous coating layer and the adhesive porous layer had a thickness of 2 μm and 1 μm, respectively.

EXAMPLE 5

A separator was manufactured in the same manner as Example 1, except that polyvinylidene fluoride-co-hexafluoroproyplene (PVdF-HFP) as a binder polymer was added to acetone and dissolved therein at 50° C. for about 12 hours or more to obtain a binder polymer solution, and boehmite (γ-ALO(OH)) particles having an average particle diameter of 500 nm were added to the resultant binder polymer solution and dispersed therein to obtain a slurry for a porous coating layer.

The resultant separator had an asymmetric structure on both surfaces in the order of adhesive porous layer/porous polymer substrate/porous coating layer/adhesive porous layer.

In addition, in the separator, the porous coating layer and the adhesive porous layer had a thickness of 2 μm and 1 μm, respectively.

Comparative Example 1

A separator was manufactured in the same manner as Example 1, except that the adhesive porous coating layers were formed on both surfaces of the separator base through vapor-induced phase separation based on a dip coating process.

The resultant separator had an asymmetric structure on both surfaces in the order of adhesive porous layer/porous polymer substrate/porous coating layer/adhesive porous layer.

In addition, in the separator, the porous coating layer and the adhesive porous layer had a thickness of 2 μm and 1 μm, respectively.

Comparative Example 2

A separator was manufactured in the same manner as Example 1, except that the porous coating layers were coated on both surfaces of a polyethylene porous membrane (porosity 40%) and the coating thickness was controlled to about 10 μm to obtain a separator base, and the adhesive porous coating layers were formed on both surfaces of the separator base through vapor-induced phase separation based on a dip coating process.

The resultant separator had a symmetric structure on both surfaces in the order of (adhesive resin-containing porous coating layer)/porous polymer substrate/(adhesive polymer-containing porous coating layer.

In addition, in the separator, each of the adhesive polymer-containing porous coating layers had a thickness of 2 μm.

Evaluation Results

The separators obtained according to Examples 1-5 and Comparative Examples 1 and 2 were evaluated for separator-separator adhesion (gf/25 mm), separator-anode adhesion (gf/25 mm), air permeation time (sec/100 mL) and resistance. The results are shown in the following Table 1.

Particular methods for evaluation are shown below.

(1) Evaluation of Separator-Separator Adhesion (gf/25 mm)

The separators obtained according to Examples 1-5 and Comparative Examples 1 and 2 were cut into a size of 25 mm×100 mm and two sheets of each separator were provided.

The two separator sheets were overlapped with each other, inserted between PET films with a thickness of 100 μm and adhered to each other by passing them through a roll laminator at 100° C. Herein, the roll laminator speed was 0.3 m/min and heated for 30 seconds under a pressure of 2 kgf/cm$^2$.

The end of the adhered two separator sheets was mounted to an UTM system (LLOYD Instrument LF Plus), and then the force required for separating the separators was measured by applying force thereto in both directions.

(2) Evaluation of Separator-Anode Adhesion (gf/25 mm)

An active material (natural graphite and artificial graphite (weight ratio 5:5)), a conductive material (Super P) and a binder (polyvinylidene fluoride (PVdF)) were mixed at a weight ratio of 92:2:6 and dispersed in water. Then, the resultant mixture was coated onto copper foil to provide an anode, which, in turn, was cut into a size of 15 mm×100 mm.

The separators obtained according to Examples 1-5 and Comparative Examples 1 and 2 were cut into a size of 10 mm×100 mm.

Each of the separators was overlapped with the anode, inserted into PET films having a thickness of 100 μm, and adhered by using a plate press. Herein, the plate press was heated to 70° C. under a pressure of 20 MPa for 5 seconds.

The end of the adhered separator and anode was mounted to an UTM system (LLOYD Instrument LF Plus), and then the force required for separating the separators was measured by applying force thereto in both directions.

(3) Evaluation of Air Permeation Time (sec/100 mL)

Gurley air permeability values were determined according to the method of ASTM D726-94. Gurley used herein is resistance against air flow and is measured by a Gurley densometer. The Gurley air permeability value described herein is shown as time (seconds) required for 100 mL of air to pass through a section of 1 in$^2$ of each of the separators according to Examples 1-5 and Comparative Example 1 and 2 under a pressure of 12.2 in H$_2$O, i.e., air permeation time.

(4) Resistance

Each of the separators obtained according to Examples 1-5 and Comparative Examples 1 and 2 was evaluated for its resistance value when it is immersed in an electrolyte. 1M LiPF$_6$-ethylene carbonate/ethyl methyl carbonate (weight ratio 3:7) was used as an electrolyte and the resistance was measured at 25° C. through an alternating current process.

TABLE 1

|  | Ex. 1 | Ex. 2 | Ex. 3 | Ex. 4 | Ex. 5 | Comp. Ex. 1 | Comp. Ex. 2 |
|---|---|---|---|---|---|---|---|
| Coating layer structure of separator | Asymmetric on both surfaces | Asymmetric on both surfaces | Symmetric on both surfaces | Asymmetric on both surfaces | Asymmetric on both surfaces | Asymmetric on both surfaces | Symmetric on both surfaces |
| Phase separation method of adhesive layer | Dry phase separation | Dry phase separation | Dry phase separation | Dry phase separation | Dry phase separation | Vapor-induced phase separation | Vapor-induced phase separation |
| Total coating thickness (μm) | 4 | 4 | 4 | 4 | 4 | 4 | 4 |
| Thickness of porous substrate (μm) | 7 | 7 | 7 | 7 | 7 | 7 | 7 |
| Total separator thickness (μm) | 11 | 11 | 11 | 11 | 11 | 11 | 11 |
| Separator-separator adhesion (gf/25 mm) | 26 | 20 | 22 | 20 | 23 | 27 | 9 |

TABLE 1-continued

|  | Ex. 1 | Ex. 2 | Ex. 3 | Ex. 4 | Ex. 5 | Comp. Ex. 1 | Comp. Ex. 2 |
|---|---|---|---|---|---|---|---|
| Separator-anode adhesion (gf/25 mm) | 16 | 10 | 12 | 11 | 12 | 18 | 8 |
| Air permeation time (sec/100 mL) | 270 | 240 | 275 | 311 | 265 | 490 | 400 |
| Resistance (Ω) | 1.03 | 0.94 | 1.01 | 1.08 | 0.99 | 1.34 | 1.21 |

Observation of Surface Morphology

The surface morphology of each of the separators was observed with field emission scanning electron microscopy (FE-SEM). The results are shown in FIGS. 1-7.

Figure 6:
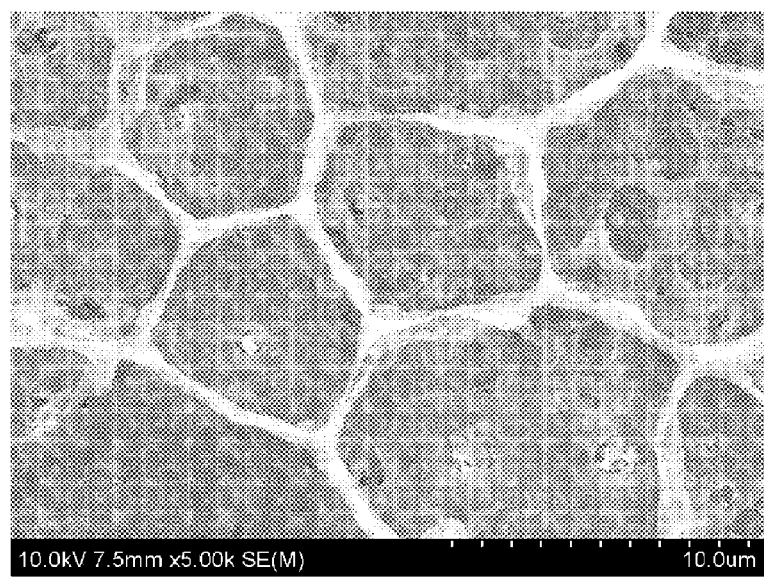
Figure 7:
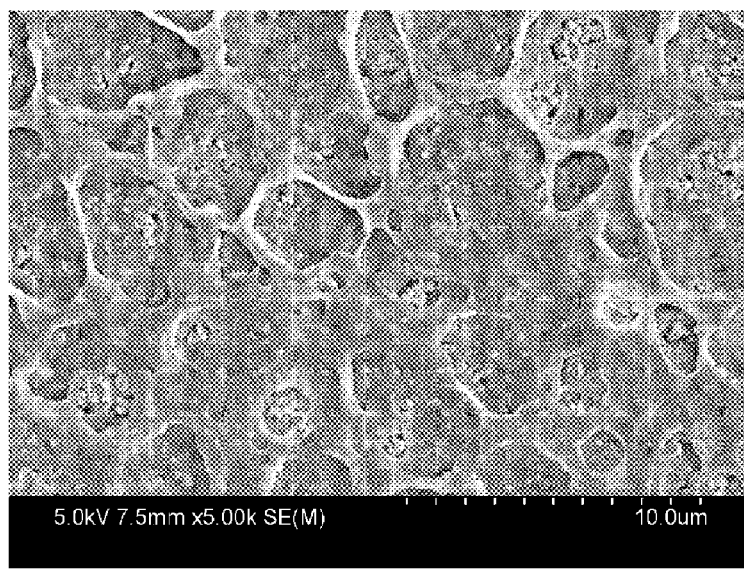

In FIGS. 6 and 7, it can be seen that the shape of the surface adhesive layer is significantly non-uniform due to the vapor-induced phase separation occurring on the surface. On the contrary, it can be seen that the shape of each of the surface adhesive layers in FIGS. 1-5 using dry phase separation is significantly uniform.

What is claimed is:

1. A separator, comprising:
    a porous polymer substrate having a plurality of pores;
    a separator base including a porous coating layer formed on at least one surface of the porous polymer substrate, said porous coating layer comprising a plurality of inorganic particles and a binder polymer disposed partially or totally on the surface of the inorganic particles to connect and fix the inorganic particles with each other; and
    an adhesive porous layer formed on at least one surface of the separator base, said adhesive porous layer comprising an adhesive resin which shows adhesive property through heating at a temperature lower than a melting point of the porous polymer substrate,
    wherein the adhesive porous layer is provided with a porous structure formed by dry phase separation caused by an evaporation rate of a solvent and that of a non-solvent, when applying and drying a coating composition including the adhesive resin, the solvent and the non-solvent on at least one surface of the separator base,
    wherein the adhesive porous layer has a uniform surface, and
    wherein the inorganic particles are boehmite particles alone or a combination of boehmite particles with non-boehmite particles.

2. The separator according to claim 1, wherein the porous polymer substrate is a polyolefin-based porous polymer substrate.

3. The separator according to claim 2, wherein the polyolefin-based porous polymer substrate comprises any one polymer selected from the group consisting of polyethylene, polypropylene, polybutylene and polypentene, or a combination thereof.

4. The separator according to claim 1, wherein the porous polymer substrate has a thickness of 5-50 μm, a pore size of 0.01-50 μm and a porosity of 10-95%.

5. The separator according to claim 1, wherein the binder polymer is any one selected from the group consisting of polyvinylidene fluoride-co-hexafluoropropylene, polyvinylidene fluoride-co-trichloro ethylene, polymethyl methacrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethyl cellulose, cyanoethyl sucrose, pullulan and carboxymethyl cellulose, or a mixture of at least two of them.

6. The separator according to claim 1, wherein the non-boehmite particles comprise inorganic particles having a dielectric constant of 5 or more, inorganic particles capable of transporting lithium ions or a mixture thereof.

7. The separator according to claim 1, wherein the boehmite particles have an average particle diameter of 0.05-2 μm and the non-boehmite particles have an average particle diameter of 0.3-3 μm.

8. The separator according to claim 1, wherein the adhesive resin is any one selected from the group consisting of polyvinylidene fluoride-co-hexafluoropropylene, polyvinylidene fluoride-co-trichloro ethylene, polymethyl methacrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethyl cellulose, cyanoethyl sucrose, pullulan and carboxymethyl cellulose, or a mixture of at least two of them.

9. A method for manufacturing a separator, comprising the steps of:
    forming a porous coating layer comprising a plurality of inorganic particles and a binder polymer on at least one surface of a porous polymer substrate having a plurality of pores to prepare a separator base; and
    forming, on at least one surface of the separator base, an adhesive porous layer comprising an adhesive resin which shows adhesive property through heating at a temperature lower than a melting point of the porous polymer substrate,
    wherein the step of forming an adhesive porous layer includes:
    applying a coating composition including the adhesive resin, a solvent and a non-solvent onto at least one surface of the separator base; and
    drying the coating composition to form a porous structure through dry phase separation caused by the evaporation rate of the solvent and that of the non-solvent,
    wherein the adhesive porous layer has a uniform surface, and
    wherein the inorganic particles are boehmite particles alone or a combination of boehmite particles with non-boehmite particles.

10. The method for manufacturing a separator according to claim 9, wherein the solvent is any one compound selected from acetone, tetrahydrofuran, methylene chloride, chloroform, dimethyl formamide, N-methyl-2-pyrrolidone, methyl ethyl ketone and cyclohexane, or a mixture thereof; and the non-solvent is any one compound selected from methanol, ethanol, isopropyl alcohol, propanol and water, or a mixture thereof.

11. An electrochemical device comprising a cathode, an anode and a separator interposed between the cathode and the anode, wherein the separator is the separator as defined in claim 1.

12. The electrochemical device according to claim 11, which is a lithium secondary battery.

\* \* \* \* \*